(12) United States Patent
Chang

(10) Patent No.: US 11,771,083 B2
(45) Date of Patent: Oct. 3, 2023

(54) FLOWER THINNING COMPOSITION AND FLOWER THINNING METHOD USING SAME

(71) Applicant: In Kook Chang, Chungcheongbuk-do (KR)

(72) Inventor: In Kook Chang, Chungcheongbuk-do (KR)

( * ) Notice: Subject to any disclaimer, the term of this patent is extended or adjusted under 35 U.S.C. 154(b) by 551 days.

(21) Appl. No.: 16/964,732

(22) PCT Filed: Nov. 15, 2018

(86) PCT No.: PCT/KR2018/014024
§ 371 (c)(1),
(2) Date: Jul. 24, 2020

(87) PCT Pub. No.: WO2019/177222
PCT Pub. Date: Sep. 19, 2019

(65) Prior Publication Data
US 2020/0345003 A1    Nov. 5, 2020

(30) Foreign Application Priority Data

Mar. 14, 2018 (KR) .................. 10-2018-0029967
Nov. 15, 2018 (WO) ................ PCT/KR2018/014024

(51) Int. Cl.
*A01N 31/06* (2006.01)
*A01N 25/04* (2006.01)
*A01N 31/02* (2006.01)
*A01N 37/02* (2006.01)

(52) U.S. Cl.
CPC ............ *A01N 31/06* (2013.01); *A01N 25/04* (2013.01); *A01N 31/02* (2013.01); *A01N 37/02* (2013.01)

(58) Field of Classification Search
CPC .......... A01G 7/06; A01N 25/04; A01N 31/02; A01N 31/06; A01N 37/02; A01P 21/00
USPC ........................................................ 514/552
See application file for complete search history.

(56) References Cited

U.S. PATENT DOCUMENTS

| 5,242,891 A * | 9/1993 | Larsen ................ A01N 37/02 504/142 |
| 5,424,272 A * | 6/1995 | Chang ................ A01N 31/02 504/184 |
| 6,156,703 A | 12/2000 | Hicks et al. |
| 2009/0005246 A1* | 1/2009 | Schneider ............ A01N 43/90 504/108 |
| 2013/0312139 A1 | 11/2013 | Hassell et al. |
| 2015/0150260 A1 | 6/2015 | Saalfeld |

FOREIGN PATENT DOCUMENTS

| CN | 1908138 A | 2/2007 |
| CN | 103040710 A | 4/2013 |
| CN | 103952188 A | 7/2014 |
| CN | 107365575 A | 11/2017 |
| KR | 1020040028984 | 4/2004 |
| WO | 20150104344 A1 | 7/2015 |

OTHER PUBLICATIONS

European Food Safety Authority; EFSA Journal 2013;11(1):3023; Conclusion on the peer review of the pesticide risk assessment of the active Fatty acids to C18 (approved under Regulation (EC) No. 1107/2009 as Fatty acids C7 to C20); 62 pgs.
Elina D. Coneva and John A. Cline; Blossom Thinners Reduce Crop Load and Increase Fruit Size and Quality of Peaches; HortScience 41(5): pp. 1253-1258; 2006.
G.L. Steffens, T.C., Tso and D.W. Spaulding; J. Agr. Food Chem.; Fatty Alcohol of Tobacco Axillary and Terminal Bud Growth; 4 pgs.
First Office Action for CN201880090736.9, counterpart Chinese application, dated Apr. 1, 2021 (9 pages) and translation (8 pages).

\* cited by examiner

*Primary Examiner* — Johann R Richter
*Assistant Examiner* — Courtney A Brown
(74) *Attorney, Agent, or Firm* — Renner, Kenner, Greive, Bobak, Taylor & Weber

(57) ABSTRACT

The present disclosure relates to a flower-thinning composition, which is safe for honeybees when sprayed at a low concentration, and a flower-thinning method using the same.

10 Claims, No Drawings

FLOWER THINNING COMPOSITION AND FLOWER THINNING METHOD USING SAME

TECHNICAL FIELD

The present disclosure relates to a flower-thinning composition, which is safe for honeybees when sprayed at a low concentration, and a flower-thinning method using the same.

Perennial fruit trees such as apples, pears, tangerines, peaches, etc., bear fruit biennially. That is, if these trees fruit heavily in a year with good climatic conditions, they exhaust nutrients, and hence produce very small numbers of flowers and fruits in the following year. In addition, the fruits of the year, in which the trees fruit heavily, are small in size and inferior in quality.

In order to harvest a predetermined amount of high-quality fruits each year in fruit cultivation, flower thinning and fruit thinning are performed to keep fruiting at a predetermined level. Before flower thinning or fruit thinning was performed using chemicals, it required a lot of labor to remove flowers or young fruits by hand. Currently, flower thinning or fruit thinning is being performed by hand in combination with chemicals.

A flower-thinning composition, that is, a flower-thinning agent, refers to an agent that causes flowers and young fruitlets to fall by preventing pollen germination or interfering with fertilization in order to control the fruiting of fruit trees.

BACKGROUND ART

As flower thinning agents based on chemicals, fertilizers such as lime-sulfur mixture or urea are initially used at a high concentration (1 to 6%) to harm and scorch the flower pistil, stamen, petal, receptacle or peduncle, thus preventing fertilization, or to produce ethylene in the wounded part and activate the abscission layer of the peduncle base, causing the flower to fall. Ethylene, a gaseous phytohormone, is known as a hormone that is involved in fruit maturation, plant aging, etc., and causes leaf drop or fruit drop by activating the abscission layer of petiole or peduncle. Recently, ammonium thiosulphate (ATS), a type of fertilizer, has been known as a more effective fertilizer flower thinning agent than the lime-sulfur mixture or urea. However, the effect of this material is not consistent, depending on climatic conditions, soil, and crop conditions, and this material is difficult to use. In some cases, it is used at a high concentration and thus it harms young leaves, receptacles, peduncles, young fruits, etc. In addition, it is known that the ATS can interfere with photosynthesis and harm the growth of the whole fruit tree, and if the volume of ATS solutions sprayed is reduced, the ATS is effective only when it is sprayed at a high concentration (10% or more), but in this case, it can cause fruit and bud phytotoxicity.

In addition to fertilizers, many chemicals have been tested to examine their flower-thinning effects, and fatty acids and derivatives thereof were registered as a U.S. patent (U.S. Pat. No. 5,242,891 A) (entitled "Methods for fruit thinning comprising applying fatty acids or derivatives thereof to flowers") in the early 1990s. However, these fatty acids were not approved for use as a flower-thinning agent in some European countries, because they are phytotoxic to young leaves and are highly toxic to honeybees (EFSA Journal, 2013; 11(1):3023 Conclusion on the peer review of the pesticide risk assessment of the active substance Fatty acids $C_7$ to $C_{18}$ (approved under Regulation (EC) No 1107/2009 as Fatty acids $C_7$ to $C_{20}$)).

Flower-thinning agents are sprayed at a time when honeybees collect pollen and fertilize flowers. Thus, substances safe for honeybees have been required. In particular, in recent years, the number of honeybees in the world has rapidly decreased, and hence the use of fatty acids or oils that are highly toxic to honeybees has been restrained.

Aliphatic alcohols are able to scorch and kill plant young leaves, sprouts or axillary and terminal buds at a high concentration (volume concentration of 2% to 8%). It is known that when aliphatic alcohols having different numbers of carbon atoms are mixed together, the scorching effects may be increased synergistically (U.S. Pat. No. 5,424,272A: In-Kook Chang, 1995) (Fatty alcohol composition and method for controlling axillary and terminal buds of agronomic, horticultural and forestary crops).

Non-emulsified pure aliphatic alcohols, for example, are phytotoxic to plants. However, when a fatty alcohol emulsified with an emulsifier is diluted in water to a concentration of 4 to 6% and sprayed, it can scorch and kill tobacco axillary buds, but causes little or no phytotoxicity to foliage leaves. Thus, it is used as an inhibitor of tobacco axillary bud growth (S. L, Steffens, T. C. Tso and D. W. Spaulding, Fatty alcohol inhibition of tobacco axillary and terminal bud growth. J. Agr. Food chem Vol 15, No 6: 972-975, 1967). Using the above-described effect, E. D. Coneva and J. A. Cline used 3-4% decyl alcohol (1-decanol) to test peach flower thinning, but significant phytotoxicity to peach leaves occurred (Hortscience 41(5): 1253-1258, 2006).

DISCLOSURE

Technical Problem

A chemical flower-thinning agent of the present disclosure is capable of exhibiting a sufficient flower-thinning effect in the concentration and spray volume of agent used, a method of using the agent, and the timing when the agent is used, and at the same time, is capable of minimizing variations occurring depending on growth conditions such as climate, soil, fertilization, and varieties, should not be phytotoxic to leaves (such as young leaves) and fruit-forming parts to the extent acceptable to the user, and should be harmless to pollen fertilization-mediating insects, such as honeybees, to an extent in which it can be registered as an agricultural chemical agent.

Furthermore, the present disclosure intends to provide a flower-thinning composition including an aliphatic alcohol with low or no toxicity to honeybees at a minimally low concentration effective in flower thinning.

In addition, the present disclosure intends to provide the use-concentration range of aliphatic alcohol formulations, which maximizes efficacy, minimizes phytotoxicity and, at the same time, is less harmful or harmless to honeybees.

Technical Solution

To solve the above technical problem,
a flower-thinning composition of the present disclosure may include: at least one selected from among $C_6$-$C_{12}$ aliphatic alcohols; or at least one methyl ester selected from among methyl esters of $C_6$-$C_{12}$ aliphatic acids; or at least one selected from among $C_{10}$-$C_{18}$ aliphatic alcohols having one or more double bonds; or at least one selected from among $C_6$-$C_8$ aromatic alcohols.

In addition, the flower-thinning composition may include an alcohol emulsion obtained by mixing the aliphatic alcohol or aromatic alcohol with at least one emulsifier.

In addition, the $C_6$-$C_{12}$ aliphatic alcohol may be 1-hexanol, 1-heptanol, 1-octanol, 1-nonanol, 1-decanol, 1-undecanol, 1-dodecanol, or 2-ethyl-1-hexanol.

In addition, the at least one methyl ester selected from among methyl esters of $C_6$-$C_{12}$ aliphatic acids may be methyl octanoate or methyl decanoate or mixture thereof.

In addition, the $C_{10}$-$C_{18}$ aliphatic alcohol having one or more double bonds may be oleyl alcohol.

In addition, the $C_6$-$C_8$ aromatic alcohol may be cyclohexanol.

In addition, the emulsifier may be a non-ionic emulsifier.

In addition, the emulsifier may be at least one selected from among Tween-80 (POE(20) sorbitan monooleate), Tween-20 (POE(20) sorbitan monolaurate), Tween-60 (POE(20) sorbitan monostearate), Span-80 (sorbitan monooleate), Span-20 (sorbitan monolaurate), fatty acid ethoxylates or glycerol stearates so that the hydrophilic-lipophilic balance (HLB) of the emulsifier is optimized.

In addition, the emulsifier may be included in an amount of 3 to 50 wt % based on the aliphatic alcohol.

In addition, among the at least one alcohol each selected from the $C_6$-$C_{12}$ aliphatic alcohols, two different alcohol species selected from the above aliphatic alcohols may a mixture of 1-octanol and 1-decanol.

In a flower-thinning method of the present disclosure, spray timing of the flower-thinning composition may be when lateral flowers are in full bloom.

In addition, the alcohol concentration of the flower-thinning composition may be 0.01% (v/v) to 0.8% (v/v), more preferably 0.05% to 0.2% (v/v), upon spraying.

Advantageous Effects

The flower-thinning agent of the present disclosure exhibits a sufficient flower-thinning effect and, at the same time, is not phytotoxic to leaves, such as young leaves, and fruit-forming parts, and is less harmful or harmless to insects such as honeybees, which mediate pollen fertilization.

In addition, the flower-thinning agent has the effect of minimizing variations that occur depending on growth conditions such as climate, soil, fertilization, and varieties.

MODE FOR INVENTION

Hereinafter, the flower-thinning agent of the present disclosure, which includes a low-concentration aliphatic alcohol which is safe for honeybees, will be described in more detail.

The present disclosure intends to provide a flower-thinning composition which includes a specific aliphatic alcohol or an alcohol mixture obtained by mixing specific aliphatic alcohols at a specific ratio, in which the composition causes no phytotoxicity in the concentration and dose ranges with sufficient efficacy, and is harmless to honeybees when sprayed at a low concentration, as well as a flower-thinning method using the same.

The present disclosure provides a flower-thinning composition which is safe for honeybees when sprayed at a low concentration, the flower-thinning composition including: at least one selected from among $C_6$-$C_{12}$ linear or branched aliphatic alcohols; or at least one methyl ester selected from among methyl esters of $C_6$-$C_{12}$ aliphatic acids; or at least one selected from among $C_{10}$-$C_{18}$ aliphatic alcohols having one or more double bonds; or at least one selected from among $C_6$-$C_8$ aromatic alcohols.

In addition, the present disclosure provides a flower-thinning composition which is safe for honeybees when sprayed at a low concentration, wherein the flower-thinning composition includes an alcohol emulsion obtained by mixing the aliphatic alcohol or aromatic alcohol with at least one emulsifier.

In the present disclosure, the $C_6$-$C_{12}$ aliphatic alcohol may be 1-hexanol, 1-heptanol, 1-octanol, 1-nonanol, 1-decanol, 1-undecanol, 1-dodecanol or 2-ethyl-1-hexanol, and at least one selected from among these alcohols may be used.

The present disclosure also provides a flower-thinning composition which has reduced phytotoxicity and toxicity to honeybees and increased efficacy, the flower-thinning composition including two or more aliphatic alcohols having different numbers of carbons, selected from the $C_6$-$C_{12}$ aliphatic alcohols of the present disclosure.

When, among at least one alcohol each selected from the $C_6$-$C_{12}$ aliphatic alcohols, two species of alcohols are selected, the two are preferably 1-octanol and 1-decanol, or 1-decanol and 1-dodecanol, or 1-octanol and 1-dodecanol.

In the present disclosure, the at least one methyl ester selected from among methyl esters of $C_6$-$C_{12}$ aliphatic acids is preferably methyl octanoate which is a methyl ester of a $C_8$ aliphatic alcohol or methyl decanoate or mixture thereof.

In the present disclosure, the $C_{10}$-$C_{18}$ aliphatic alcohol having one or more double bonds is preferably oleyl alcohol.

In the present disclosure, the $C_6$-$C_8$ aromatic alcohol is preferably cyclohexanol.

In order for the flower-thinning composition of the present disclosure to exhibit a flower-thinning effect in fruit cultivation, flowers should be treated with the composition, and the composition should be sprayed after dilution in water. However, since the aliphatic alcohol is almost insoluble in water and is separated, it is emulsified in water using an emulsifier before it is sprayed. As the emulsifier, there may be used nonionic, anionic or cationic emulsifiers. However, since the electrolyte concentration of water used may vary, nonionic emulsifiers or surfactants are mainly used. In addition, the emulsifier that is used in the present disclosure may be a neutral (nonionic) emulsifier.

Examples of suitable emulsifiers for emulsification of the aliphatic alcohol or aromatic alcohol include sorbitan fatty acid ester-based emulsifiers and polyoxyethylene (POE) sorbitan fatty acid ester-based emulsifiers, but those skilled in the art will appreciate that emulsification cannot be achieved only by these emulsifiers.

More specifically, the emulsifier that is used in the present disclosure may be at least one selected from among Tween-80 (POE(20) sorbitan monooleate), Tween-20 (POE(20) sorbitan monolaurate), Tween-60 (POE(20) sorbitan monostearate), Span-80 (sorbitan monooleate), Span-20 (sorbitan monolaurate), fatty acid ethoxylates and glycerol stearates, and the hydrophilic-lipophilic balance (HLB) of the emulsifier is optimized.

The emulsifier may be included in an amount of 3 wt % (weight %) to 50 wt % based on the weight of the aliphatic alcohol formulation. If the amount of the emulsifier is less than 3 wt % based on the weight of the formulation, emulsification may not be easily achieved due to the instability of the formulation, and the aliphatic alcohol may be separated, causing phytotoxicity, and if the amount of the emulsifier is more than 50 wt %, the amount of the active ingredient may decrease, leading to a decrease in efficacy.

In the flower-thinning composition of the present disclosure, the alcohol in the alcohol emulsion is preferably sprayed at a concentration of 0.01 vol % (volume %) to 1 vol %, particularly at a low concentration of 0.01 vol % to 0.8 vol % in view of phytotoxicity. If the alcohol is sprayed at a concentration of less than 0.01 vol %, the thinning activity is too low to be commercially acceptable, and if the alcohol is sprayed at a concentration of more than 1 vol %, phytotoxicity occurs. Also, the alcohol concentration in the spraying emulsion is preferred at a concentration of 0.05 vol % to 0.4 vol %, even more preferably at 0.05 vol % to 0.2 vol %. A mixture of the methyl esters of fatty acids in emulsion is sprayed at a concentration of 0.05 vol % to 0.2 vol %. The term "vol %" means % (v/v).

The alcohol emulsion of the present disclosure is less toxic to honeybees than the active ingredient dissolved in acetone.

The spray timing of the flower-thinning agent of the present disclosure is preferably when lateral flowers are in full bloom.

variety, were tested at low concentrations. Each of the chemical solutions was sprayed with a DIA (FURUPLA DIA SPRAY 570, Furupla Co., Ltd.) handy spray in both right and left directions in a sufficient amount to run along each flower cluster.

In this test, treatment (spraying) was performed when lateral flowers was in full bloom (Apr. 25, 2014), and phytotoxicity was assessed by visual scoring on day 4 after post-spraying (April 29) and day 11 after post-spraying (May 6). The flower-thinning effect was measured by recording the number of young fruits set without flower thinning on 20 days post-spraying (May 15). The flower thinning activity relative to that of the untreated group was presented as (1−number of young fruits in treated group/number of young fruits in untreated group)×100. This test was designed to have 8 replications with one flower cluster as one replication. Fertilization of the apple flowers was induced by natural fertilization. The number of lateral flowers per fruit cluster was 5 on average. The test results for the flower thinning effects of the one alcohol species formulations of the present disclosure are shown in Table 1 below.

TABLE 1

Flower-thinning effects of one alcohol species formulations of aliphatic alcohols

| | | | Efficacy | | | | | |
|---|---|---|---|---|---|---|---|---|
| No. | Treatment agents | Concentration (%) | Number of lateral fruits set | Lateral flower-thinning rate (%)[2] | Number of central fruits set | Total number of fruits set | Total flower-thinning rate (%)[3] | Phytotoxicity[1] |
| 1 | 1-Hexanol | 1 | 5 | 74 | 5 | 10 | 60 | 1 |
| 2 | 1-Hexanol | 0.2 | 9 | 53 | 6 | 15 | 40 | 0 |
| 3 | 1-Octanol | 1 | 1 | 95 | 3 | 4 | 84 | 2 |
| 4 | 1-Octanol | 0.2 | 6 | 68 | 7 | 13 | 48 | 1 |
| 5 | 1-Decanol | 0.2 | 10 | 47 | 5 | 15 | 40 | 1 |
| 6 | 1-Decanol | 0.05 | 17 | 11 | 5 | 22 | 12 | 0 |
| 7 | 1-Decanol | 0.01 | 16 | 16 | 6 | 22 | 12 | 0 |
| 8 | Oleyl alcohol | 0.1 | — | 16 | — | — | — | 1 |
| 9 | Lime-sulfur mixture | 0.72 | 11 | 42 | 5 | 16 | 36 | 1 |
| 10 | Untreated | — | 19 | 0 | 6 | 25 | 0 | 0 |

[1]Phytotoxicity (criteria)
1: a case in which 10% or less of shoots in the treated group scorched or the color or shape of shoots changed; commercially available limit of phytotoxicity.
2: 10 to 30% of shoots or mature leaves scorched.
3: 30 to 50% of shoots or mature leaves scorched.
4: More than 50% of shoots or mature leaves scorched.
[2]The lateral flower-thinning rate is the flower-thinning rate relative to that of the untreated group, and is expressed as (1 − number of set lateral fruits in treated group/number of set lateral fruits in untreated group) × 100.
[3]The total flower-thinning rate is the flower-thinning rate relative to that of the untreated group, and is expressed as (1 − total number of set fruits in treated group/total number of set fruits in untreated group) × 100.

In addition, it is well known to those skilled in the art that other surfactants or materials may be added in order to increase the flower-thinning effect, or reduce toxicity to honeybees or phytotoxicity, or increase the stability of the emulsifiable concentrates or the stability of the emulsified spray solution. For example, fatty alcohol ethoxylate or fatty acid ethoxylate as surfactants may also be added in order to increase the flower-thinning effect.

Hereinafter, the present disclosure will be described in detail with reference to specific examples. However, these examples are merely to illustrate the present disclosure and are not intended to limit the scope of the present disclosure.

[Test Example 1] Test for Efficacy and Phytotoxicity of One Linear Aliphatic Alcohol Species Formulations The effects of 1-hexanol, 1-octanol, 1-decanol and oleyl alcohol, which are linear aliphatic alcohols present in a liquid state at 18° C., on the flower thinning of the Fuji apple At a concentration of 1% (V/V), 1-octanol had sufficient efficacy, showed a phytotoxicity of grade 2, which is not commercially available. However, at a low concentration of 0.2%, the phytotoxicity of 1-octanol was commercially acceptable (grade 1). The lateral flower-thinning effect of 1-octanol relative to the untreated group was 68%, which was superior to that of the lime-sulfur mixture (42%). The natural abscission rate of lateral flowers was about 50%. 1-decanol showed no phytotoxicity at a low concentration of 0.01 to 0.05%.

[Test Example 2] Test for Efficacy and Phytotoxicity of Mixtures of Aliphatic Alcohols When 1-octanol or 1-decanol, which is a linear aliphatic alcohol present in a liquid state at 18° C., and 1-dodecanol present in a solid state at 18° C., are mixed together at a specific ratio, these mixtures may be maintained in a liquid state at 18° C. depending on the content of 1-dodecanol. In addition, each of a mixture of 1-octanol and 1-dodecanol, a mixture of 1-decanol and 1-dodecanol, a mixture of 1-octanol and 1-decanol, a mixture of methyl n-octanoate and methyl n-decanoate (or $C_{810}$ methyl ester) and a methyl ester of a mixture of 1-octanol and 1-decanol was mixed with the emulsifier Proem (85 wt % Tween 80+15 wt % Tween 20 mixture) at a weight ratio of 20%, and then diluted in tap water to a predetermined concentration (V/V) and sprayed in the same manner as Test Example 1. All other test procedures were the same as those in Test Example 1. The flower-thinning effects of the mixtures of aliphatic alcohols and the mixtures of methyl esters of aliphatic acids of the present disclosure are shown in Table 2.

ratio showed a flower-thinning effect of 89%. This demonstrates that the aliphatic alcohols have a synergistic effect when they are mixed together.

The synergisms are obtained as follows: At a spray concentration of 0.2%, the flower-thinning effect of 1-octanol (Table 1) is 68%, and the flower-thinning contribution rate of 1-octanol in IAP-108 having each active ingredient content of 40% is 68%×0.4=27.2%. In addition, the flower-thinning effect of 1-decanol (Table 1) is 47%, and the flower-thinning contribution rate of 1-decanol is 47%×0.6=28.2%. Thus, the expected flower-thinning effect of

TABLE 2

Flower-thinning effects of the mixtures of aliphatic alcohols and the mixtures of methyl esters of aliphatic acids

| No. | Treatment agent | Concentration (v/v % or fold) | Efficacy | | | |
| --- | --- | --- | --- | --- | --- | --- |
| | | | Lateral flower-thinning rate (%) relative to that of untreated group | Number of central fruits set | Total flower-thinning rate (%) relative to that of untreated group | Phytotoxicity[1] |
| 1 | IAP-4832 | 0.2 | 47 | 5 | 40 | 0 |
| 2 | IAP-4832 | 0.05 | 32 | 5 | 28 | 0 |
| 3 | IAP-4832 | 0.01 | −5 | 5 | 0 | 0 |
| 4 | IAP-812 | 0.2 | 89 | 2 | 84 | 1 |
| 5 | IAP-812 | 0.05 | 47 | 4 | 44 | 0 |
| 6 | IAP-812 | 0.01 | 11 | 6 | 8 | 0 |
| 7 | IAP-108 | 0.2 | 89 | 7 | 64 | 1 |
| 8 | IAP-108 | 0.05 | 16 | 6 | 12 | 0 |
| 9 | IAP-108 | 0.01 | 21 | 6 | 16 | 0 |
| 10 | IAP-M810[2] | 0.2 | 74 | 4 | 64 | 1 |
| 11 | IAP-M810[2] | 0.05 | 16 | 6 | 12 | 0 |
| 12 | Jeok & Bee[3] | 800-fold diluted | 16 | 1 | 32 | 0 |
| 13 | Koduri[4] | 1000-fold diluted | 37 | 6 | 28 | 0 |
| 14 | Koduri[4] | 500-fold diluted | 42 | 5 | 36 | 0 |
| 15 | Lime-sulfur mixture | 0.72 | 42 | 5 | 36 | 1 |
| 16 | Untreated | — | 0 | 6 | 0 | 0 |

[1]Phytotoxicity criteria are the same as those in Table 1;
[2]IAP-4832 is an emulsion of($C_{10}$ + $C_{12}$ alcohol mixture), IAP-812 is an emulsion of ($C_8$ + $C_{12}$ alcohol mixture), IAP-108 is an emulsion of ($C_8$ + $C_{10}$ alcohol mixture), and IAP-M810 is an emulsion of methyl esters of $C_{810}$ fatty acids ($C_8$ + $C_{10}$ fatty acid methyl esters mixture).
[3]Jeok & Bee (manufactured by Sunnong Chemical Co., Ltd., Korea), and
[4]Koduri (manufactured by Apple Co., Ltd., Korea).

The group treated with the aliphatic alcohol formulation (IAP-812), a mixture (w/w) of 40 wt % 1-octanol, 40 wt % 1-dodecanol and 20 wt % Proem, showed the highest lateral flower-thinning effect, and showed a lateral flower-thinning effect approaching 90% relative to that of the untreated group at a spray concentration of 0.2% (v/v).

The flower-thinning effect of the 1-octanol/1-decanol mixture IAP-108 (32 wt % $C_8$+48 wt % $C_{10}$) formulation was lower than that of IAP-812, but higher than that of IAP-4832 (32 wt % $C_{10}$+48 wt % $C_{12}$). The $C_{810}$ methyl ester (IAP-M810) also had a sufficient lateral flower-thinning effect (74%) at a concentration of 0.2% (v/v).

The lateral flower-thinning effect of the one alcohol species formulations of 1-octanol or 1-decanol, was lower than that of the mixture formulations at the same spray concentration. That is, at a spray concentration of 0.2%, each one alcohol species formulation obtained using 1-octanol or 1-decanol as an active ingredient showed a flower-thinning contribution rate of 55.4%, whereas IAP-108 obtained by mixing the aliphatic alcohols together at a specific mixing IAP-108 is 27.2%+28.2%=55.4%. However, the actual flower-thinning effect of IAP-108 was shown to be 89%.

It was shown that the aliphatic alcohol mixture of the present disclosure had little or no phytotoxicity at a spray concentration of 0.2% or less.

[Test Example 3] Efficacy Test Depending on Use Time (Chemical Agent Spray Time)

In order to determine the chemical spray timing when lateral flowers can be most effectively thinned by interfering with fertilization of lateral flowers but saving central flowers, the time period ranging from 50% of full bloom of central flowers to 3 days after full bloom of lateral flowers was divided into four equal periods and a test was performed for the divided periods. All test procedures were performed by spraying the same compositions as those in Test Example 2 according to the method of Test Example 1.

TABLE 3

Spray timing-dependent efficacy of flower-thinning agents including aliphatic alcohols

| Treatment | | | Efficacy | | | |
|---|---|---|---|---|---|---|
| | | | Number of lateral fruits set | 100-(number of fruits set/ untreated × 100)(%) | Total number of fruits set | 100-(number of fruits set/ untreated × 100)(%) |
| Start of central flower blooming | 1 | IAP-4832 0.2% | 17 | 23 | 21 | 30 |
| | 2 | IAP-4832 0.05% | 19 | 14 | 24 | 20 |
| | 3 | IAP-108 0.2% | 15 | 32 | 20 | 33 |
| | 4 | IAP-108 0.05% | 18 | 18 | 22 | 27 |
| | 5 | IAP-2080 0.2% | 15 | 32 | 20 | 33 |
| | 6 | IAP-2080 0.05% | 17 | 23 | 25 | 17 |
| | | Average | 16.8 | 23.5 | 22.0 | 26.7 |
| Full bloom of central flowers (50% blooming of lateral flowers) | 1 | IAP-4832 0.2% | 22 | 0 | 27 | 10 |
| | 2 | IAP-4832 0.05% | 23 | −5 | 29 | 3 |
| | 3 | IAP-108 0.2% | 16 | 27 | 22 | 27 |
| | 4 | IAP-108 0.05% | 10 | 55 | 16 | 47 |
| | 5 | IAP-2080 0.2% | 13 | 41 | 19 | 37 |
| | 6 | IAP-2080 0.05% | 18 | 18 | 25 | 17 |
| | | Average | 17.0 | 22.7 | 23.0 | 23.3 |
| Time of full bloom of lateral flowers | 1 | IAP-4832 0.2% | 13 | 41 | 20 | 33 |
| | 2 | IAP-4832 0.05% | 16 | 27 | 24 | 20 |
| | 3 | IAP-108 0.2% | 11 | 50 | 19 | 37 |
| | 4 | IAP-108 0.05% | 15 | 32 | 22 | 27 |
| | 5 | IAP-2080 0.2% | 13 | 41 | 21 | 30 |
| | 6 | IAP-2080 0.05% | 16 | 27 | 23 | 23 |
| | | Average | 14.0 | 36.4 | 21.5 | 28.3 |
| 3 days after full bloom of lateral flowers | 1 | IAP-4832 0.2% | 7 | 68 | 14 | 53 |
| | 2 | IAP-4832 0.05% | 18 | 18 | 25 | 17 |
| | 3 | IAP-108 0.2% | 16 | 27 | 22 | 27 |
| | 4 | IAP-108 0.05% | 16 | 27 | 23 | 23 |
| | 5 | IAP-2080 0.2% | 13 | 41 | 20 | 33 |
| | 6 | IAP-2080 0.05% | 17 | 23 | 22 | 27 |
| | | Average | 14.5 | 34.1 | 21.0 | 30.0 |
| | None | Untreated | 22 | 0 | 30 | 0 |

IAP-4832 described above is composed of 32 wt % 1-decanol, 48 wt % 1-dodecanol and 20 wt % Proem. In addition, IAP-108 described above is composed of 32 wt % 1-octanol, 48 wt % 1-decanol and 20 wt % Proem. In addition, IAP-2080 described above is composed of 64 wt % 1-octanol, 16 wt % 1-decanol and 20 wt % Proem. From Table 3 above, it can be seen that the average lateral flower-thinning rate when treated with the six treatments is highest in the time of full bloom of lateral flowers, when compared to the untreated control, suggesting that it is most efficient that the spray timing of the agents is when lateral flowers are in full bloom.

[Test Example 4] Test for Evaluation of Toxicity to Honeybees

Since spray timing of flower-thinning agents is the time when honeybees fertilize apple flowers, the toxicity of the spray agents to honeybees is an important issue. In particular, since the number of honeybees on the planet has decreased over the past decade, substances that are toxic to honeybees have been banned from use during flowering time. Since fatty acids and the like are highly toxic to honeybees, the use thereof during flowering time in the EU and the like has been limited.

To examine the toxicity of aliphatic alcohols to honeybees, various aliphatic alcohol technical material (>98%) as active ingredients were dissolved in acetone, and the acute contact toxicities of the aliphatic alcohols to honeybees are recorded as percent lethality in Table 4 below. In addition, in the same test, the contact toxicities of fatty acids to honeybees were compared, and the results are shown in Table 4 below.

In the contact toxicity test for honeybees, healthy honeybees bred in an outdoor beekeeping system were acclimated in a breeding cage, and then anesthetized with $CO_2$. Thirteen honeybees were placed in each test cage, and three honeybees, which did not wake up from anesthesia or were lethargic, were removed, and the chest of each of the remaining ten healthy honeybees was treated with 1 μl of each aliphatic alcohol (active ingredient) dissolved in acetone. This treatment was repeated 3 times for ten honeybees per test cage, and the honeybees were bred at 25° C. under dark conditions for 72 hours. The lethality of each aliphatic alcohol was measured.

TABLE 4

Results of test for contact toxicities of aliphatic alcohols and fatty acids to honeybees

| Aliphatic alcohols | | Treatment dose (μg)[1] | Lethality (%)[2] | Fatty acids | Treatment dose (μg)[1] | Lethality (%) |
|---|---|---|---|---|---|---|
| 1 | 1-hexanol | 200 | 6.7 | 1-hexanoic acid | 200 | 30.0 |
| 2 | 1-octanol | 50 | 26.7 | 1-octanoic acid | 50 | 36.7 |

TABLE 4-continued

Results of test for contact toxicities of aliphatic alcohols and fatty acids to honeybees

| Aliphatic alcohols | Treatment dose (μg)[1] | Lethality (%)[2] | Fatty acids | Treatment dose (μg)[1] | Lethality (%) |
|---|---|---|---|---|---|
| 3  1-octanol | 200 | 50 | 1-octaboic acid | 200 | 60 |
| 4  1-decanol | 50 | 70 | 1-decanoic acid | 50 | 43.3 |
| 5  1-decanol | 200 | 100 | 1-decanoic acid | 200 | 90 |
| 6  1-oleyl alcohol | 200 | 20 | 1-oleic acid | 200 | 43.3 |
| 7  Acetone control | — | 16.7 | — | — | — |

[1]Treatment dose is the amount of active ingredient treated per honeybee;
[2]measured 72 hours after treatment; lethality is the average of three repeated measurements.

1-hexanol was not toxic even at a treatment dose of active ingredient of 200 μg, but the toxicity increased as carbon number increased, and 1-decanol ($C_{10}$) showed the highest lethality.

In addition, the aliphatic alcohols other than 1-decanol were less toxic to honeybees than the fatty acids having the same number of carbon atoms, but 1-decanol was more toxic than 1-decanoic acid.

[Test Example 5] Test for Evaluation of Difference in Toxicity Between Active Ingredients and Formulations A comparison was made between the toxicity to honeybees in the case in which honeybees were treated with active ingredients dissolved in acetone in the same amounts and the toxicity to honeybees in the case in which honeybees were treated with alcohol emulsions prepared by emulsifying aliphatic alcohols with 17 wt % (w/w) of Tween-80 (polyoxyethylene (20) sorbitan monooleate). All test procedures were the same as those in Test Example 4.

TABLE 5

Results of honeybee contact toxicity comparison between active ingredients and formulations

| Active ingredients | Treatment dose (μg) | Lethality (%) | Alcohol emulsions | Treatment dose (μg) | Lethality (%) |
|---|---|---|---|---|---|
| 1-hexanol | 100 | 3.3 | IAP-8060 | 100 | 0.0 |
| 1-heptanol | 100 | 33.3 | IAP-8040 | 100 | 23.3 |
| Cyclohexanol | 100 | 33.3 | IAP-8050 | 100 | 26.7 |
| 2-ethyl-1-hexanol | 100 | 60 | IAP-8070 | 200 | 26.7 |
| 1-octanol | 100 | 50 | IAP-8000 | 100 | 36.7 |
| 1-decanol | 50 | 70 | IAP-8010 | 50 | 53.3 |

In the alcohol emulsions described in Table 5 above, the aliphatic alcohol in IAP-8060 is 1-hexanol, the aliphatic alcohol in IAP-8040 is 1-heptanol, the aliphatic alcohol in IAP-8050 is cyclohexanol, the aliphatic alcohol in IAP-8070 is 2-ethyl-1-hexanol, the aliphatic alcohol in IAP-8000 is 1-octanol, and the aliphatic alcohol in IAP-8010 is 1-decanol. It can be seen that the toxicity to honeybees of the alcohol emulsion prepared using the same active ingredient is lower than that of the active ingredient dissolved in acetone.

[Test Example 6] Evaluation of Toxicity to Honeybees Depending on Spray Concentration of Formulations According to a method in which flower-thinning formulations prepared using various aliphatic alcohol emulsions are sprayed at concentrations effective in flower thinning, the formulations were sprayed to honeybees and the toxicity thereof was tested. All one alcohol species formulations and alcohol mixture formulations of aliphatic alcohols were prepared according to the method of Test Example 5. All test procedures, excluding the method of spraying the formulations to honeybees, were the same in those in Test Example 4, and the test formulations used are shown in Table 6 below.

Ten honeybees were positioned such that their backs faced up, and 0.35 ml of each of the formulations was sprayed twice to the honeybees at the same height and pressure by a modified sprayer, which has been used to spray flower-thinning agents, in such a manner that the backs of the honeybees were almost covered with each formulation. The results of the honeybee toxicity test performed depending on the spray concentration of the formulations of the present disclosure are shown in Table 6 below.

TABLE 6

Results of honeybee toxicity test depending on spray concentration of formulations

| Test formulations | Concentration (%) | Lethargy + lethality (%) 48 hours | Lethargy + lethality (%) 96 hours |
|---|---|---|---|
| IAP-8000 (1-octanol emulsion) | 0.8 | 6.7 | 13.3 |
|  | 0.4 | 3.3 | 13.3 |
|  | 0.2 | 0 | 13.3 |
| IAP-8080 (1-oleyl alcohol emulsion) | 0.8 | 0 | 23.3 |
|  | 0.4 | 6.7 | 26.7 |
|  | 0.2 | 3.3 | 16.7 |
|  | 0.1 | 0 | 10 |
| IAP-8070 (ethylhexanol alcohol emulsion) | 0.8 | 3.3 | 3.3 |
|  | 0.4 | 6.7 | 10 |
|  | 0.2 | 3.3 | 10 |

TABLE 6-continued

Results of honeybee toxicity test depending on spray concentration of formulations

| Treatment | | Lethargy + lethality (%) | |
|---|---|---|---|
| Test formulations | Concentration (%) | 48 hours | 96 hours |
| IAP-108 (mixture formulation of 1-octanol and 1-decanol) | 0.8 | 26.7 | 43.3 |
| | 0.4 | 13.3 | 16.7 |
| | 0.2 | 6.7 | 20 |
| | 0.1 | 0 | 0 |
| IAP-8010 (1-decanol emulsion) | 0.8 | 36.7 | 56.7 |
| | 0.4 | 33.3 | 43.3 |
| | 0.2 | 26.7 | 33.3 |
| IAP-8060 (hexanol emulsion) | 0.8 | 6.7 | 20 |
| | 0.4 | 3.3 | 16.7 |
| | 0.2 | 0 | 3.3 |
| IAP-812 (mixture formulation of 1-octanol and 1-dodecanol) | 0.8 | 60 | 76.7 |
| | 0.4 | 46.7 | 56.7 |
| | 0.2 | 23.3 | 43.3 |
| Water spray | — | 3.3 | 13.3 |
| Untreated (passed out) | — | 3.3 | 13.3 |

The 1-octanol emulsion (IAP-8000) was not toxic at a spray concentration of 0.2 vol % to 0.8 vol % (v/v). The 1-oleyl alcohol emulsion (IAP-8080) and the IAP-108 emulsion (a mixture formulation of 1-octanol and 1-decanol) were not toxic at a spray concentration of 0.1%, and the 1-hexanol emulsion (IAP-8060) was not toxic at a spray concentration of 0.2%. The IAP-812 (a mixture formulation of 1-octanol and 1-dodecanol) had an excellent flower-thinning effect at a spray concentration of 0.2%, but showed high toxicity to honeybees at the same concentration and showed higher toxicity to honeybees than the 1-decanol emulsion (IAP-8010).

In Test Example 6, the mixture formulation IAP-108 had a higher synergistic effect on flower thinning than the flower-thinning effect of the one alcohol species formulations IAP-8000 and IAP-8010. However, in toxicity to honeybees at 96 hours, the toxicity to honeybees of the mixture formulation IAP-108 was rather lower than the toxicities to honeybees of the one alcohol species formulations (at a spray concentration of 0.2%, 1-octanol has a lethality of 13.3% and 1-decanol has a lethality of 33.3%, and the contribution rate of the content of 1-octanol and 1-decanol, calculated based on the lethality values, is 25.3%). The lethality of IAP-108 at a spray concentration of 0.2% is 20%, which is lower than the expected value. At a spray concentration of 0.4%, the toxic lethality of 1-octanol was 13.3% and the toxic lethality of 1-decanol was 43.3%, and the contribution rate of the content of 1-octanol and 1-decanol, calculated based on the lethality values, was 35.3%, which was higher than the toxicity of IAP-108 (16.7%). A synergism that reduces the toxicity to honeybees of 1-octanol and 1-decanol did not appear at a spray concentration of 0.8%.

The invention claimed is:

1. A flower-thinning composition comprising
an alcohol selected from the group consisting of $C_6$-$C_{12}$ aliphatic alcohols, $C_6$-$C_8$ aromatic alcohols, and combinations thereof, and
at least one emulsifier;
wherein the alcohol is present at a concentration of from 0.01 vol. % to 0.8 vol. % relative to the flower-thinning composition, wherein the flower-thinning composition is safe to honeybees when sprayed at the concentration of from 0.01 vol. % to 0.8 vol. % of the alcohol.

2. The flower-thinning composition of claim 1, wherein the alcohol includes a combination of at least one of the $C_6$-$C_{12}$ aliphatic alcohols and at least one of the $C_6$-$C_8$ aromatic alcohols, the flower-thinning composition comprising an alcohol emulsifiable concentrate obtained by mixing the combination with the at least one emulsifier.

3. The flower-thinning composition of claim 2, wherein the emulsifier is a nonionic emulsifier.

4. The flower-thinning composition of claim 2, wherein the emulsifier is at least one selected from among Tween-80 (POE(20) sorbitan monooleate), Tween-20 (POE(20) sorbitan monolaurate), Tween-60 (POE(20) sorbitan monostearate), Span-80 (sorbitan monooleate), Span-20 (sorbitan monolaurate), fatty acid ethoxylates or glycerol stearates and wherein the hydrophilic-lipophilic balance is optimized.

5. The flower-thinning composition of claim 2, wherein the emulsifier is comprised in an amount of from 3 to 50 wt % based on the alcohol emulsifiable concentrate.

6. The flower-thinning composition of claim 1, wherein at least one of the $C_6$-$C_{12}$ aliphatic alcohols is present and is selected from the group consisting of 1-hexanol, 1-heptanol, 1-octanol, 1-nonanol, 1-decanol, 1-undecanol, 1-dodecanol, 2-ethyl-1-hexanol, and mixtures of two or more of the group.

7. The flower-thinning composition of claim 1, wherein at least one of the $C_6$-$C_8$ aromatic alcohol is present and is cyclohexanol.

8. The flower-thinning composition of claim 1, wherein at least one of the $C_6$-$C_{12}$ aliphatic alcohols is present and wherein a mixture of 1-octanol and 1-decanol is among the at least one of the $C_6$-$C_{12}$ aliphatic alcohols and wherein the mixture of 1-octanol and 1-decanol exhibits a synergistic effect as the in that a toxicity of the mixture to honeybees decreases synergistically and, at the same time, a flower-thinning effect of the mixture increases synergistically.

9. A flower-thinning method comprising
spraying flowers with the flower-thinning composition of claim 1, wherein the step of spraying occurs when lateral flowers of the flowers are in full bloom.

10. A flower-thinning method comprising
spraying flowers with the flower-thinning composition of claim 1, wherein the alcohol concentration of the alcohol of the flower-thinning composition is from 0.05% (v/v) to 0.8% (v/v) for the step of spraying.

* * * * *